US008301416B2

(12) United States Patent
Ono et al.

(10) Patent No.: US 8,301,416 B2
(45) Date of Patent: Oct. 30, 2012

(54) OPTICAL NOISE INDEX CALCULATION METHOD, OPTICAL NOISE INDEX CALCULATION APPARATUS, AND OPTICAL SAMPLING OSCILLOSCOPE

(75) Inventors: Shunsuke Ono, Kakamigahara (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 437 days.

(21) Appl. No.: 12/453,934

(22) Filed: May 27, 2009

(65) Prior Publication Data
US 2009/0240473 A1    Sep. 24, 2009

Related U.S. Application Data

(63) Continuation of application No. PCT/JP2006/323854, filed on Nov. 29, 2006.

(51) Int. Cl.
*G06F 19/00*    (2011.01)

(52) U.S. Cl. ........... 702/190; 702/60; 702/195; 356/327

(58) Field of Classification Search ............ 702/60, 702/61, 62, 65, 190, 191, 193, 195; 356/327, 356/453
See application file for complete search history.

(56) References Cited

U.S. PATENT DOCUMENTS

| | | | | |
|---|---|---|---|---|
| 3,729,633 A | * | 4/1973 | Eros et al. | 398/202 |
| 4,435,850 A | * | 3/1984 | Bowen et al. | 398/40 |
| 6,456,424 B1 | * | 9/2002 | Arbore et al. | 359/330 |
| 6,501,591 B1 | * | 12/2002 | Kumar et al. | 359/330 |
| 6,654,561 B1 | * | 11/2003 | Terahara et al. | 398/26 |
| 7,796,894 B1 | * | 9/2010 | Yao | 398/159 |
| 2005/0238070 A1 | * | 10/2005 | Imeshev et al. | 372/21 |
| 2006/0051100 A1 | | 3/2006 | Watanabe | |
| 2006/0159463 A1 | * | 7/2006 | Futami et al. | 398/152 |

FOREIGN PATENT DOCUMENTS

| | | |
|---|---|---|
| JP | 9-23188 | 1/1997 |
| JP | 2006-184851 | 7/2006 |
| JP | 2006-194842 | 7/2006 |

OTHER PUBLICATIONS

S. Watanabe et al., "Novel Fiber Kerr-Switch with Parametric Gain: Demonstration of Optical Demultiplexing and Sampling up to 640 Gb/s", Sep. 7, 2006, 4 pages.
International Search Report for PCT/JP2006/323864, mailed Mar. 6, 2007.

* cited by examiner

*Primary Examiner* — Jeffrey R West
(74) *Attorney, Agent, or Firm* — Staas & Halsey LLP

(57) ABSTRACT

A method is for calculating an optical noise index of a signal light extraction apparatus that extracts signal light in a polarization plane by inputting signal light and a sampling pulse, different from the signal light in polarization plane by a given angle, to a nonlinear optical medium, and by passing light output from the nonlinear optical medium through an orthogonal polarizer having a polarization plane orthogonal to that of the signal light. The method includes calculating an output optical noise of the signal light extraction apparatus using a parametric gain of the nonlinear optical medium, a power of a quantum noise of the light having passed through the orthogonal polarizer, and a ratio of a power of the signal light and a power of the signal light sampled by the sampling pulse; and calculating an optical noise index using the output optical noise.

6 Claims, 6 Drawing Sheets

FIG.6 RELATED ART
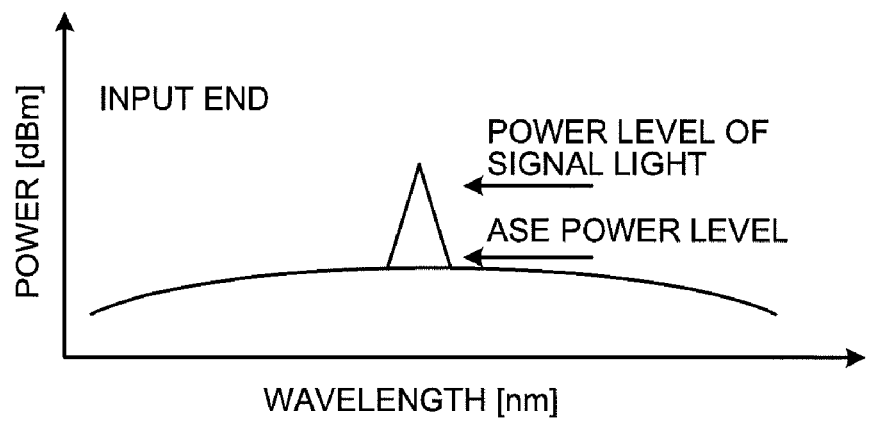
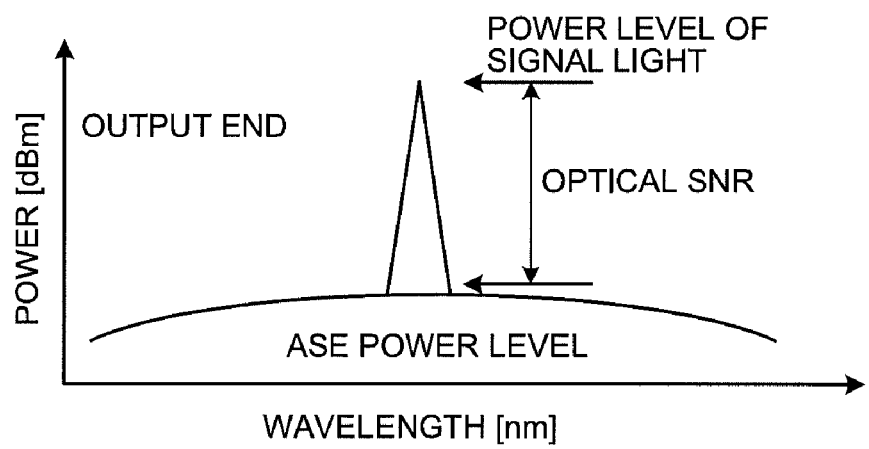

OPTICAL NOISE INDEX CALCULATION METHOD, OPTICAL NOISE INDEX CALCULATION APPARATUS, AND OPTICAL SAMPLING OSCILLOSCOPE

CROSS-REFERENCE TO RELATED APPLICATION(S)

This application is a continuation of PCT international application Ser. No. PCT/JP2006/323854 filed on Nov. 29, 2006 which designates the United States, incorporated herein by reference, the entire contents of which are incorporated herein by reference.

FIELD

The present invention relates to an optical noise index calculation method, an optical noise index calculation apparatus, and an optical sampling oscilloscope as an signal light extraction apparatus, for calculating an optical noise index properly representing optical noise characteristics of the signal light extraction apparatus. The signal light extraction apparatus extracts a part of signal light by inputting the signal light and a control optical pulse different from the signal light in polarization plane by a given angle, to a nonlinear optical medium, and by making light output from the nonlinear optical medium pass through an orthogonal polarizer having a polarization plane orthogonal to that of the signal light.

BACKGROUND

Currently, some optical sampling oscilloscopes used for observing ultrahigh-speed signal light have been commercialized. An optical sampling oscilloscope is a measurement instrument for accurately observing and evaluating a waveform of an optical signal at a high speed that cannot be observed by means of electricity.

A bit rate of the optical signal has recently reached 40 Gb/s, and, in an attempt to realize a future high-speed system, an element technology is under development to enable optical signal transmission at 160 Gb/s or higher. Therefore, an optical sampling oscilloscope with a higher time resolution is demanded. Accordingly, generation of short pulse light, as sampling light, having a narrower pulse width than that of signal light is essential.

If the sampling pulse width is narrow, sampling points per pulse can be increased, thus enabling the optical sampling oscilloscope to measure a waveform closer to the actual optical waveform (increased time resolution). However, by implementing an optical gate in a time domain, optical noise could increase in the optical waveform output after the optical sampling is applied, compared with optical noise in the original input optical pulse. In other words, accuracy of the optical waveform measurement and quality of the optical pulse (optical noise, Q-value) are in trade-off relationship.

Therefore, in an optical sampling oscilloscope, understanding of intrinsic optical noise of the optical sampling oscilloscope is an important measurement parameter in defining characteristics of the measurement instrument, as well as in defining conditions that the pulse of an optical waveform is measured under.

A typical method for measuring the optical noise is a probe method used for measuring noise in signal light amplified by an erbium-doped fiber amplifier (EDFA) as depicted in FIG. 5. In an EDFA, an optical spectrum form almost does not change between an input end and an output end as depicted in FIG. 6. Therefore, noise in an optical signal can be defined by measuring an optical noise level and an optical signal level, and subtracting the optical noise level from the optical signal level. This is because a current bit rate of the signal light amplified by the EDFA does not require a broad bandwidth, and power level of the signal light is not high enough to induce a nonlinear optical effect that causes the optical signal spectrum to change.

An example of such an optical sampling oscilloscope is described in detail in Japanese Laid-open Patent Publication No. 2006-184851.

However, in an optical sampling oscilloscope using a nonlinear medium, an optical signal to be measured is at a high bit rate (up to 160 Gb/s), and a bandwidth of the signal light is broad. Moreover, as depicted in FIG. 7, due to nonlinear optical effects, such as four wave mixing, on the sampling light or the signal light, the signal light broadens further in a wavelength domain. Therefore, to avoid being influenced by adjacent signal light, the sampled signal light needs to be filtered using an optical filter at the output end. Thus, it becomes difficult to determine the level of the optical noise. Moreover, the spectrum of the optical signal differs greatly before and after being input to the nonlinear medium. For these reasons, an optical sampling oscilloscope using a nonlinear medium has a problem that it is difficult to measure the optical noise level accurately in the wavelength domain.

Furthermore, parameters indicating the quality of the optical pulse, such as a Q-value of the optical pulse, are basically calculated from a measurement of the optical noise. Therefore, with commercialized optical sampling oscilloscopes, it has been difficult to specify and guarantee the quality of a pulse, and to understand the intrinsic optical noise characteristics of the optical sampling oscilloscope, such characteristics being essential in a measurement instrument.

SUMMARY

According to an aspect of the invention, a method is for calculating an optical noise index of a signal light extraction apparatus that extracts signal light in a polarization plane by inputting signal light and a sampling pulse different from the signal light in polarization plane by a given angle to a nonlinear optical medium, and by passing light output from the nonlinear optical medium through an orthogonal polarizer having a polarization plane orthogonal to that of the signal light. The method includes calculating an output optical noise of the signal light extraction apparatus using a parametric gain of the nonlinear optical medium, a power of a quantum noise of the light having passed through the orthogonal polarizer, and a ratio of a power of the signal light and a power of the signal light sampled by the sampling pulse; and calculating an optical noise index using the output optical noise calculated in the calculating of the output optical noise.

According to another aspect of an embodiment, an optical noise index calculation apparatus according to another aspect of the present invention calculates an optical noise index of a signal light extraction apparatus that extracts a part of signal light by inputting signal light and a control optical pulse different from the signal light in polarization plane by a given angle to a nonlinear optical medium, and by making light output from the nonlinear optical medium pass through an orthogonal polarizer having a polarization plane orthogonal to that of the signal light. The optical noise index calculation apparatus includes an optical power measuring unit that measures a power of light output from the nonlinear optical medium as a first optical power, a power of light obtained by passing the light output from the nonlinear optical medium through an identical polarizer having a same polarization plane as that of the signal light as a second optical power, and a power of light having passed through the orthogonal polarizer as a third optical power; a gain calculating unit that calculates a parametric gain of the nonlinear optical medium using the second optical power measured by the optical power measuring unit; a quantum noise calculating unit that calculates a quantum noise power of the light having passed through the orthogonal polarizer using the first optical power and the third optical power measured by the optical power measuring unit, and the parametric gain calculated by the gain calculating unit; and an index calculating unit that calculates an output optical noise of the signal light extraction apparatus using the quantum noise power calculated by the quantum noise calculating unit and the parametric gain calculated by the gain calculating unit to calculate an optical noise index using the calculated output optical noise.

The objects and advantages of the invention will be realized and attained by unit of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 6 is an illustrative diagram of an optical noise index in an erbium-doped fiber amplifier (EDFA)

DESCRIPTION OF EMBODIMENT(S)

An embodiment of the optical noise index calculation method, the optical noise index calculation apparatus, and the optical sampling oscilloscope according to the present invention will be now explained below in detail with reference to drawings. In the embodiment, the optical sampling oscilloscope will be mainly explained. However, the embodiment is not intended to limit the scope of the present invention, and the present invention can be applied to a signal light extraction apparatus (see Japanese Laid-open Patent Publication No. 2006-184851 mentioned above) that extracts a part of signal light by inputting the signal light and a control optical pulse different from the signal light in polarization plane by a given angle, to a nonlinear optical medium, and by making light output from the nonlinear optical medium pass through an orthogonal polarizer having a polarization plane orthogonal to that of the signal light.

Figure 1:
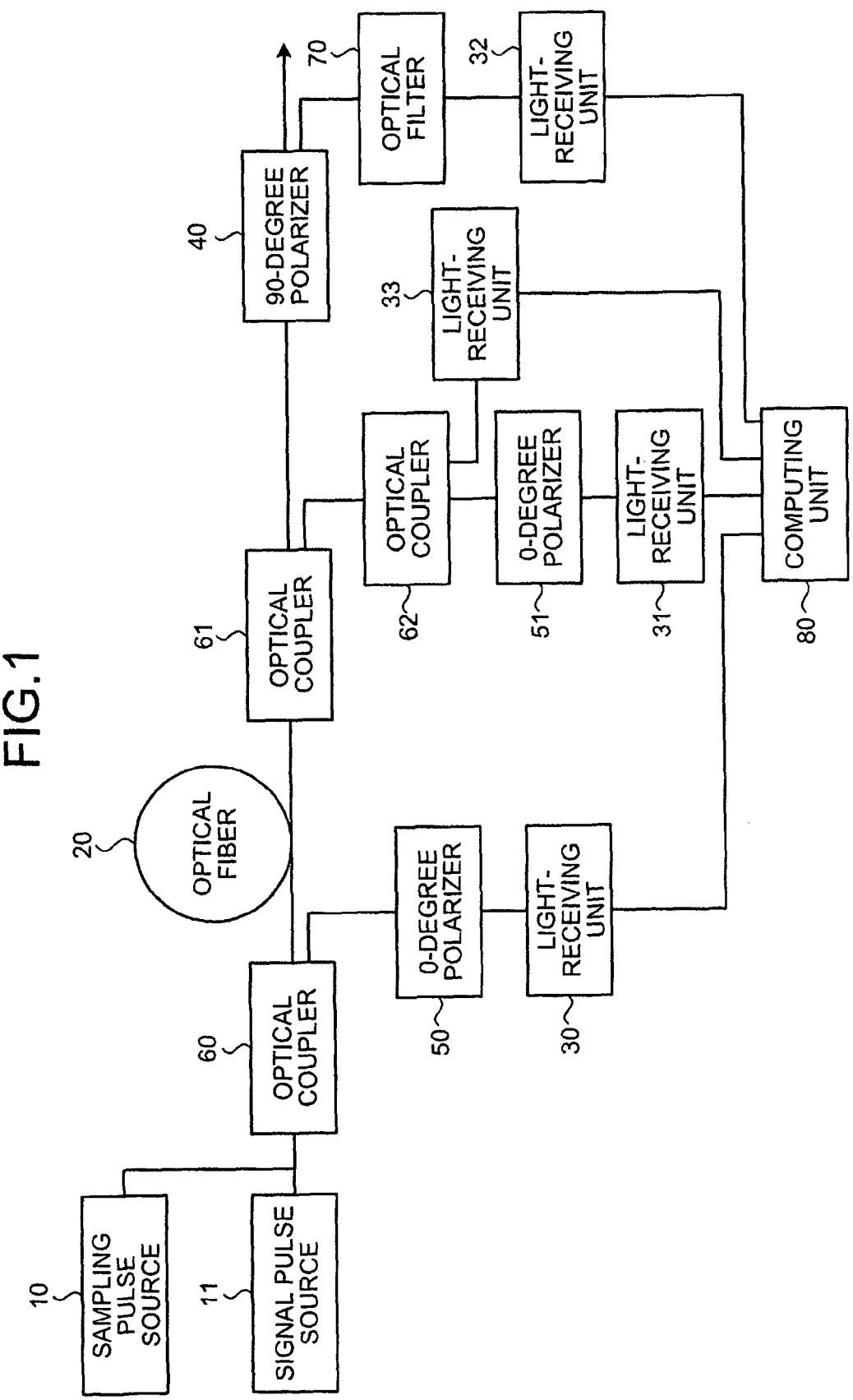
FIG. 1 is a diagram of the structure of an optical noise index calculation apparatus according to an embodiment.

To begin with, a structure of the optical noise index calculation apparatus according to an embodiment of the present invention will be now explained. FIG. 1 is a diagram of the structure of the optical noise index calculation apparatus according to the embodiment. As depicted in this figure, this optical noise index calculation apparatus includes a sampling pulse source 10, a signal pulse source 11, an optical fiber 20, light-receiving units 30, 31, 32, and 33, a 90-degree polarizer 40, 0-degree polarizers 50 and 51, optical couplers 60, 61, and 62, an optical filter 70, and a computing unit 80.

The sampling pulse source 10 is a light source for generating a sampling pulse used by the optical sampling oscilloscope, in which an optical noise index thereof is calculated by the optical noise index calculation apparatus according to the embodiment, for sampling a signal pulse. The sampling pulse source 10 generates a sampling pulse different from the signal pulse in polarization plane by 45 degrees.

The signal pulse source 11 is a light source for generating a signal pulse measured by the optical sampling oscilloscope, in which an optical noise index thereof is calculated by the optical noise index calculation apparatus according to the embodiment.

The optical fiber 20 is a nonlinear optical medium where the optical sampling oscilloscope, in which an optical noise index thereof is calculated by the optical noise index calculation apparatus according to the embodiment, imposes a nonlinear optical effect to the signal pulse and the sampling pulse for performing waveform measurement.

The light-receiving units 30, 31, 32, and 33 are devices that receive the optical signal and measure an optical power (light energy) thereof. More specifically, these units are optical spectrum analyzers that measure an optical spectrum and calculate an optical power based on the measured spectrum using a waveform power integral function.

The 90-degree polarizer 40 is a polarizer having a polarization plane orthogonal to that of the signal pulse generated by the signal pulse source 11. If incoming light consists of only the signal pulse, the 90-degree polarizer 40 blocks the incoming light; and if the signal pulse is injected with a polarization thereof rotated by the sampling pulse, this polarizer allows a part of the optical signal to pass therethrough.

The 0-degree polarizers 50 and 51 are polarizers each having a same polarization plane as that of the signal pulse generated by the signal pulse source 11. The optical couplers 60, 61, and 62 are devices that split the optical signal. The optical filter 70 is a filter for taking out the optical signal sampled by the sampling pulse.

The computing unit 80 is a device that calculates an optical noise index of the optical sampling oscilloscope using the optical power measured by the light-receiving units 30, 31, 32, and 33. This computing unit 80 not only receives the optical power measured by the light-receiving units 30, 31, 32, and 33, but also receives, from a user, a signal pulse width T, a sampling pulse width τ, a signal pulse frequency ν, a bandwidth Δν used by the optical sampling oscilloscope for measurements, a power of incoming signal light $P_{s//}$, and a power of an incoming signal noise $P_{noise//}$ to calculate the optical noise index.

The optical noise index calculated by the computing unit 80 will be now explained with reference to FIGS. 2 and 3. In the optical sampling oscilloscope, the signal pulse and the sampling pulse different from the signal pulse in polarization plane by 45 degrees are input to an optical fiber that is the nonlinear optical medium. The light output from the optical fiber is made to pass through the 90-degree polarizer having a polarization plane orthogonal to that of the signal pulse to extract a part of the signal pulse.

Figure 2:
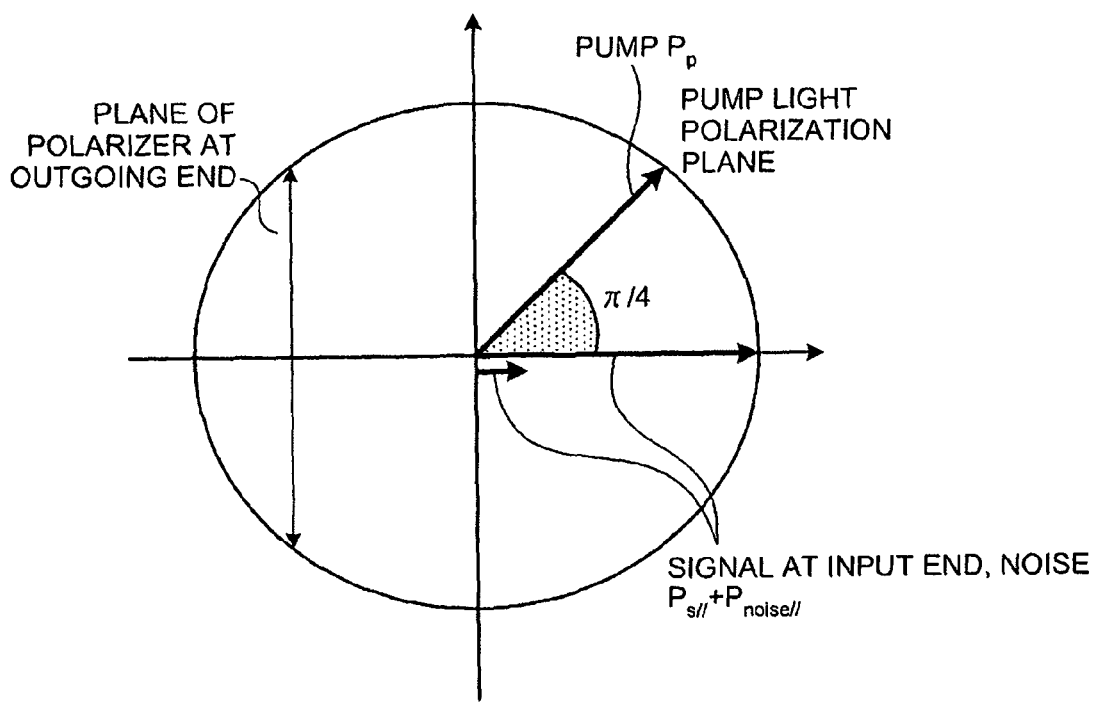
FIG. 2 is a diagram of power of incoming light used for calculating an optical noise index.

In other words, in the optical sampling oscilloscope, the signal pulse is injected from an incoming end to be orthogonal to a plane of the 90-degree polarizer arranged at the outgoing end, as depicted in FIG. 2. At this time, the optical noise input to the incoming end of the optical sampling oscilloscope can be expressed as:

$$OSNR_{in} = P_{s//}/P_{noise//} \qquad (1)$$

In FIG. 2, "PUMP" denotes the sampling pulse.

In the optical sampling, a sampling pulse that is sufficiently narrow in the time domain is used for the signal pulse. It is assumed herein that the optical signal pulse below is sampled by the sampling pulse:

$$\eta = \tau/T \quad (2)$$

Thus, the energy of the sampled pulse having the polarization thereof rotated will be:

$$\eta(P_{s//} + P_{noise//}) \quad (3)$$

Figure 3:
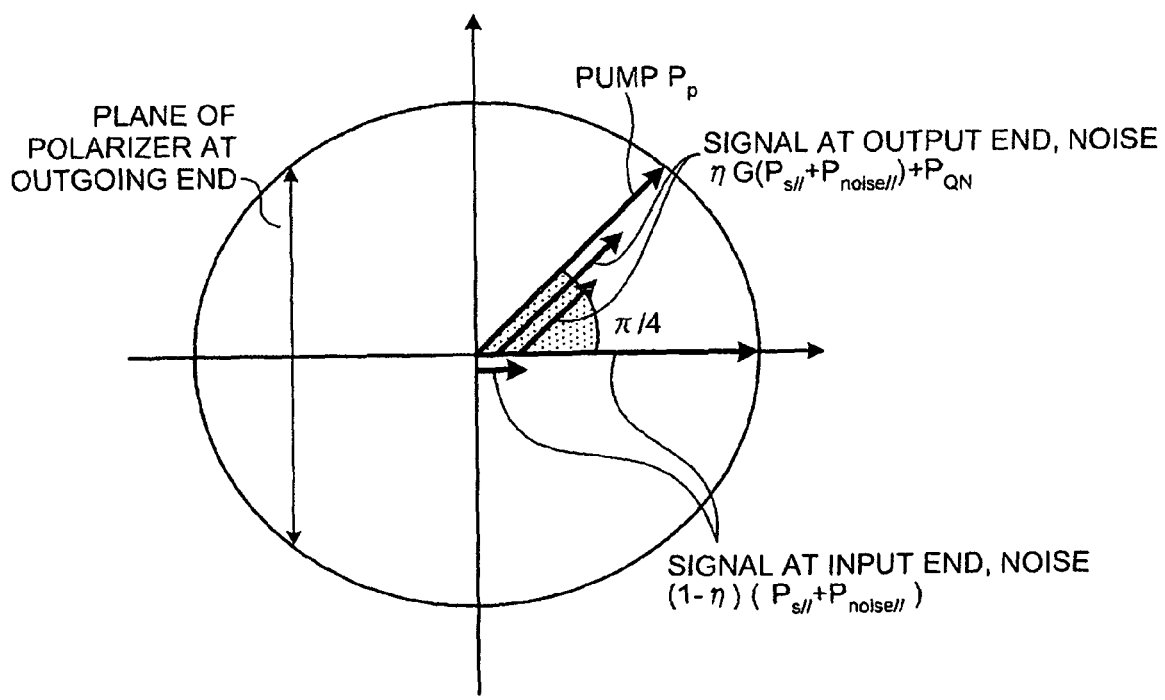
FIG. 3 is a diagram of power of outgoing light used for calculating the optical noise index.

As depicted in FIG. 3, the optical signal has its polarization rotated, and receives a parametric gain G from four wave mixing. Moreover, because a quantum noise $P_{QN}$ is added to the component with a polarization plane aligned to that of the pump light, the energy of the 45-degree component of the optical signal before passing through the 90-degree polarizer will be:

$$[\eta G(P_{s//} + P_{noise//}) + P_{QN}]\pi/4 \quad (4)$$

At this time, using the parametric gain G in the nonlinear medium, the quantum noise $P_{QN}$ can be expressed as:

$$P_{QN} = (h\nu)/2\Delta\nu(G-1) \quad (5)$$

where h is a Planck constant, and (hv)/2 is a quantum noise associated with fluctuations of a vacuum field.

Furthermore, the 0-degree component, not sampled, of the optical signal is:

$$(1-\eta)(P_{s//} + P_{noise//}) \quad (6)$$

Thus, as depicted in FIG. 3, taking all of the polarization planes into consideration, the eventual power of the optical signal before passing through the 90-degree polarizer can be expressed as:

$$[\eta G(P_{s//} + P_{noise//}) + P_{QN}]\pi/4 + [(1-\eta)(P_{s//} + P_{noise//})]_0 \quad (7)$$

where π/4 and 0 in the formula (7) denote relative angles with respect to the polarization plane of the incoming light.

If the gain G is high enough, the 45-degree component of the sampled optical signal will become half because of the 90-degree polarizer. Therefore, the energy of the optical pulse after passing through the 90-degree polarizer will be:

$$(1/2) * [\eta G(P_{s//} + P_{noise//}) + P_{QN}]\pi/4 \quad (8)$$

As depicted above, the 0-degree component of the pulse below is removed at the 90-degree polarizer:

$$(1/2) * [\eta G(P_{s//} + P_{noise//}) + P_{QN}]\pi/4 + [(1-\eta)(P_{s//} + P_{noise//})]_0 \quad (9)$$

Therefore, the optical noise of the sampled optical pulse after passing through the 90-degree polarizer $OSNR_{out}$ will be:

$$OSNR_{out} = [\eta G P_{s//}] / [\eta G P_{noise//} + P_{QN}] \quad (10)$$

In summary, using the $OSNR_{in}$ and $OSNR_{out}$, the optical noise index of the optical sampling oscilloscope is expressed as:

$$NF = OSNR_{in}/OSNR_{out}$$

$$= (P_{s//}/P_{noise//})/([\eta G P_{s//}] / [\eta G P_{noise//} + P_{QN}]) \quad (11)$$

and in logarithmic notation:

$$NF_{log} = 10\log(\eta G) - 10\log((P_{QN}/P_{noise//}) + (\eta G)) \quad (12)$$

A qualitative explanation of the formula (10) will be as follows. If η=1, because the waveform of the optical signal pulse and the waveform of the sampling pulse match both in the frequency dimension and in the wavelength dimension, noise generated by parametric amplification is not detected. If the length of the optical fiber is extremely short and the gain thereof is small, the added quantum noise will be almost zero, and NF will come close to 1. If η=0, because this is equivalent to a situation without the sampling pulse, no polarization rotation occurs. Moreover, because no parametric gain is generated, the input pulse signal will not be output, resulting in $NF_{log} = \infty$.

Amount of $P_{s//}$ and $P_{noise//}$ of the input signal light can be measured in wavelength dimension. The amount of the parametric gain G can also be measured by integrating the wavelength dimension even after an ASE-ASE beat noise representing a noise level is removed by optical filtering. Furthermore, the amount of η can be determined if the pulse width of the optical signal, the pulse width of the optical sampling signal, and a cyclic frequency are determined.

In addition, the quantum noise $P_{QN}$ is generated in the parametric amplification following a similar process as that of the generation of the noise in the ordinary four wave mixing when the signal light and the pump light have the same polarization. Therefore, the longer the nonlinear medium is, the more the noise is generated.

In other words, assuming that the length of the nonlinear medium is z, the following is obtained:

$$dP_{QN}/dz \propto (h\nu)/2\Delta\nu(G-1) \quad (13)$$

Therefore, it is possible to identify a noise level that is attributable to the quantum noise, by providing optical output points at given two points of the nonlinear medium.

Figure 4:
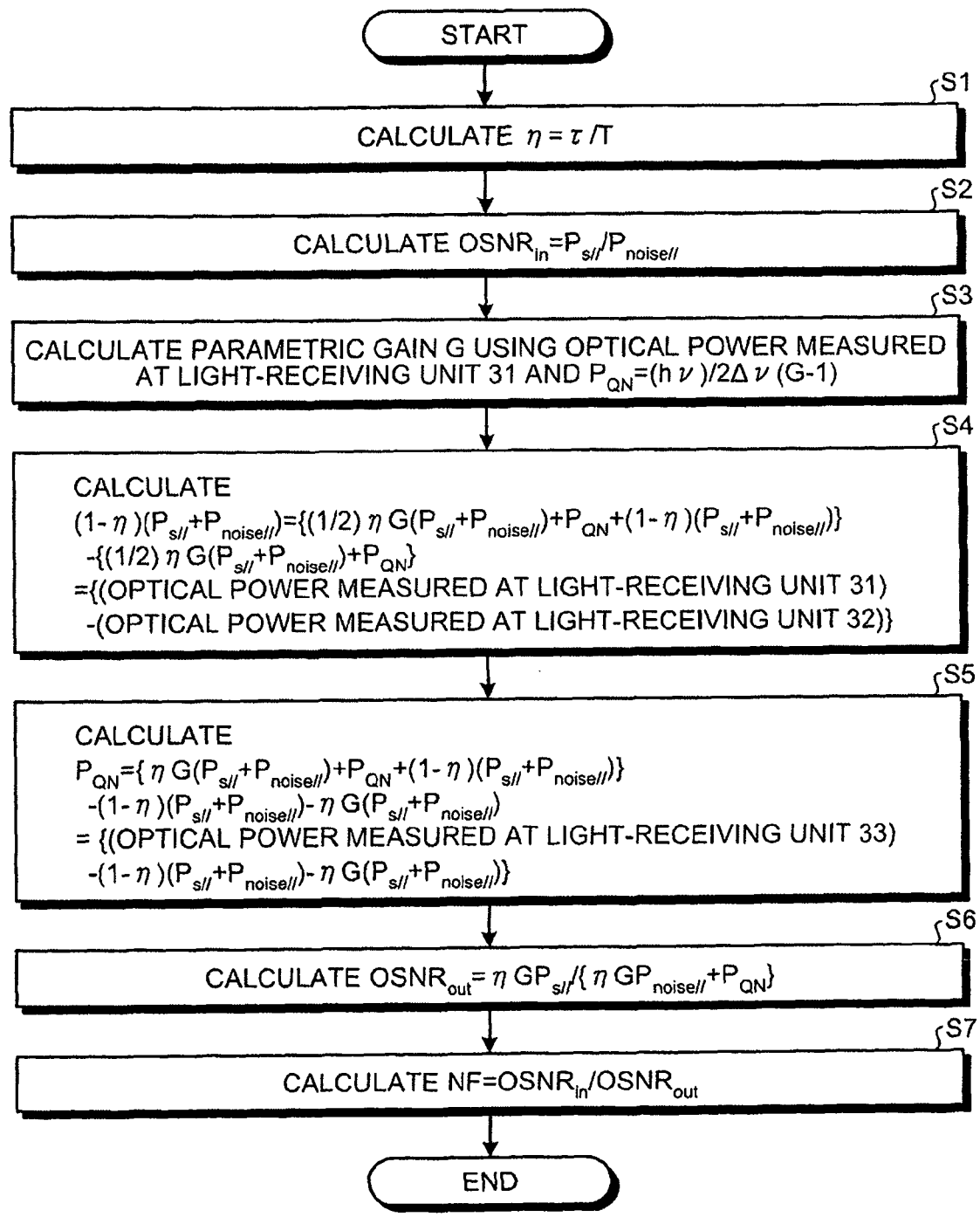
FIG. 4 is a flowchart of an optical noise index calculating process performed by a computing unit.
Figure 5:
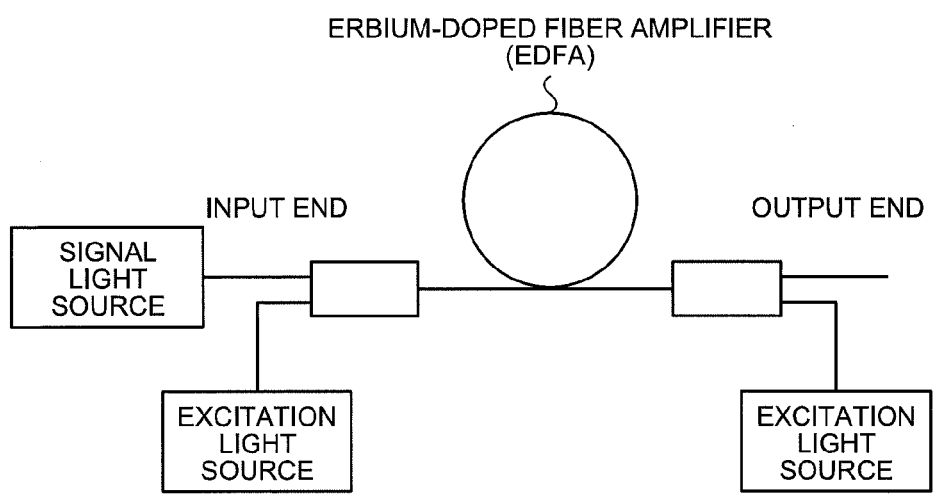
FIG. 5 is an illustrative diagram of probing.
Figure 7:
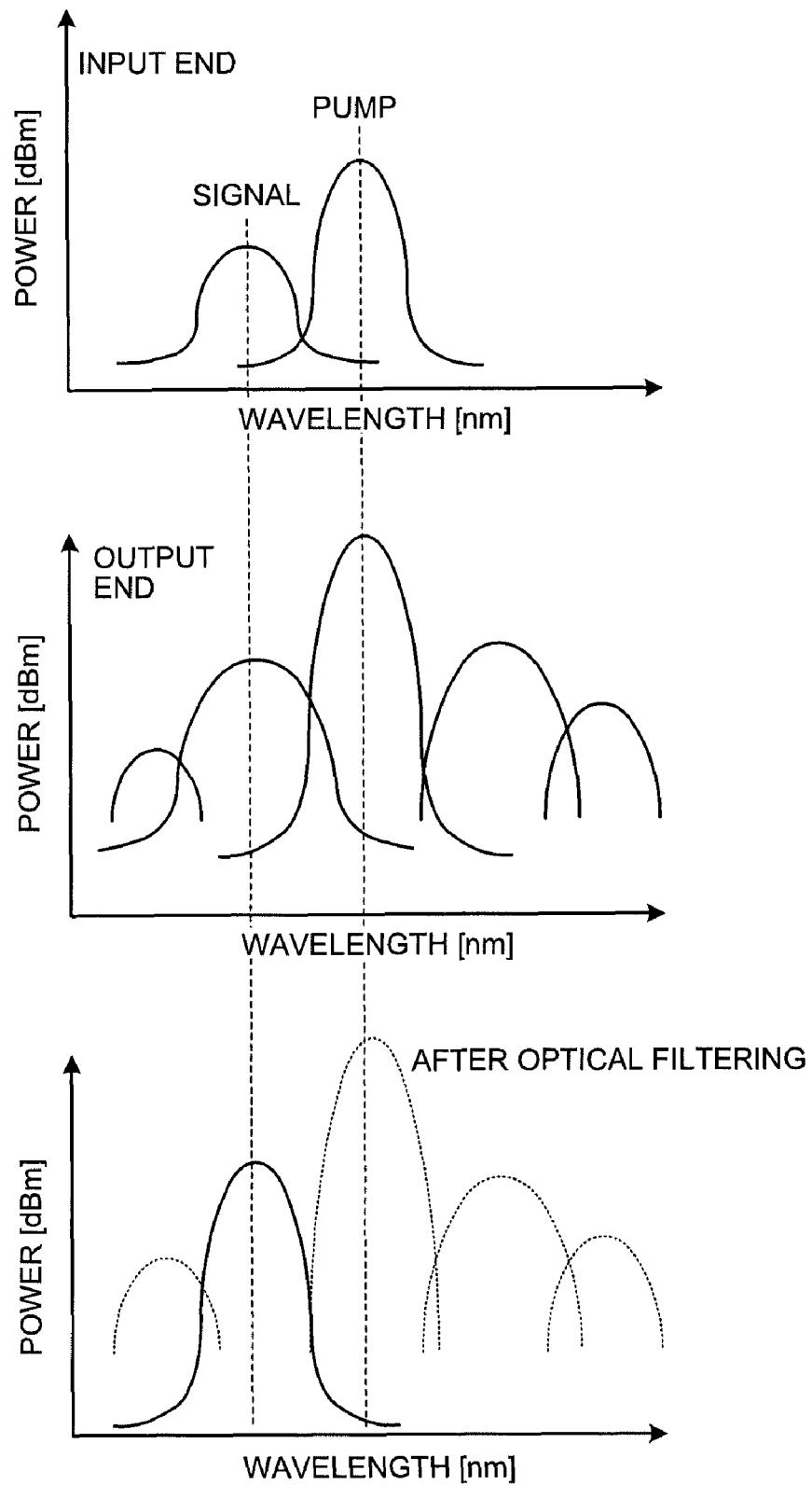
FIG. 7 is a diagram of optical power at an input end and an output end of an optical sampling oscilloscope.

An optical noise index calculation process performed by the computing unit 80 will be now explained. FIG. 4 is a flowchart of the process of the optical noise index calculation performed by the computing unit 80. As depicted in this figure, in this optical noise index calculation process, the computing unit 80 calculates η=τ/T using the signal pulse width T and the sampling pulse width τ received from the user (Step S1).

The computing unit 80 then calculates the optical noise at the incoming end $OSNR_{in} = P_{s//}/P_{noise//}$ using the power of the incoming signal light $P_{s//}$ and the power of the incoming signal noise $P_{noise//}$ received from the user (Step S2).

Using the optical power $((1/2)*\eta G(P_{s//}+P_{noise//})+P_{QN}+(1-\eta)(P_{s//}+P_{noise//}))$ measured by the light-receiving unit 31 and $P_{QN}=(h\nu)/2\Delta\nu(G-1)$, the parametric gain G is calculated (Step S3). In other words, by substituting $P_{QN}$ in $(1/2)*\eta G(P_{s//}+P_{noise//})+P_{QN}+(1-\eta)(P_{s//}+P_{noise//})$ by $P_{QN}=(h\nu)/2\Delta\nu(G-1)$, by substituting η by the value obtained at Step S1, and by substituting ν, Δν, and $(P_{s//}+P_{noise//})$ by the values accepted from the user, the optical power measured by the light-receiving unit 31 is converted to a formula having only G so that G can be obtained from the converted formula and the measurements.

Then, the optical power $((1/2)*\eta G(P_{s//}+P_{noise//})+P_{QN}$ measured by the light-receiving unit 32 is subtracted from the optical power $((1/2)*\eta G(P_{s//}+P_{noise//})+P_{QN}+(1-1)(P_{s//}+P_{noise//}))$ measured by the light-receiving unit 31 to calculate $(1-\eta)(P_{s//}+P_{noise//})$ (Step S4).

Then, $(1-\eta)(P_{s//}+P_{noise//})$ calculated at Step S4 is subtracted from the optical power $(\eta G(P_{s//}+P_{noise//}))+P_{QN}+(1-\eta)(P_{s//}+P_{noise//}))$ measured by the light-receiving unit 33, and further $\eta G(P_{s//}+P_{noise//})$ is calculated and subtracted therefrom to obtain the quantum noise $P_{QN}$ (Step S5).

Then, using the quantum noise $P_{QN}$ calculated at Step S5, the sampled optical noise after passing through the 90-degree polarizer $OSNR_{out} = \eta G P_{s//}/(\eta G P_{noise//}+P_{QN})$ is calculated (Step S6). Using $OSNR_{in}$ calculated at Step S2 and $OSNR_{out}$ calculated at Step S6, the optical noise index NF=$OSNR_{in}$/$OSNR_{out}$ is calculated (Step S7).

In this manner, by making the computing unit 80 calculate the parametric gain G based on the optical power measured by the light-receiving unit 31, calculate the sampled optical noise $OSNR_{out}$ after the 90-degree polarizer based on the calculated parametric gain G and the optical power measured by the light-receiving units 31, 32, and 33, and calculate the optical noise index NF, the optical noise characteristics of the optical sampling oscilloscope can be properly evaluated.

As described above, according to this embodiment, the signal pulse from the signal pulse source 11 and the sampling pulse from the sampling pulse source 10 are injected into the optical fiber 20; the light-receiving unit 33 measures the power of the light after passing through the optical fiber 20; the light-receiving unit 31 measures the power of the light after passing through the optical fiber 20 and then the 0-degree polarizer 51; the light-receiving unit 32 measures the power of the light after passing through the optical fiber 20, the 90-degree polarizer 40, and then the optical filter 70; and the computing unit 80 calculates the sampled optical noise $OSNR_{out}$ after passing through the 90-degree polarizer based on the optical power measured at the light-receiving units 31, 32, and 33, to further calculate the optical noise index NF. Therefore, it is possible to calculate the index for properly evaluating the optical noise characteristics of the optical sampling oscilloscope.

In this embodiment, the optical noise index calculation apparatus is explained. By providing the optical couplers 60, 61, and 62, the light-receiving units 30, 31, 32, and 33, the 0-degree polarizers 50 and 51, and the computing unit 80 of this optical noise index calculation apparatus to an optical sampling oscilloscope, it is possible to realize an optical sampling oscilloscope having an optical noise index calculating function.

According to an embodiment, it is possible to calculate the optical noise index properly representing optical noise characteristics of the signal light extraction apparatus. Therefore, the optical noise characteristics of the signal light extraction apparatus can be advantageously evaluated.

Furthermore, according to an embodiment, the optical noise index properly representing the optical noise characteristics of the signal light extraction apparatus using the four wave mixing is calculated. Therefore, the optical noise characteristics of the signal light extraction apparatus using the four wave mixing can be advantageously evaluated.

Still furthermore, according to an embodiment, the optical noise index properly representing optical noise characteristics of the signal light extraction apparatus using the optical fiber is calculated. Therefore, the optical noise characteristics of the signal light extraction apparatus using the optical fiber can be advantageously evaluated.

Still furthermore, according to an embodiment, it is possible to measure an optical power. Therefore, it is possible to calculate the optical noise index advantageously.

Still furthermore, according to an embodiment, it is possible to calculate the optical noise index properly representing optical noise characteristics of the optical sampling oscilloscope. Therefore, the optical noise characteristics of the optical sampling oscilloscope can be advantageously evaluated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical noise index calculation apparatus that calculates an optical noise index of a signal light extraction apparatus that extracts signal light in a polarization plane by inputting signal light and a sampling pulse, different from the signal light in polarization plane by a given angle, to a nonlinear optical medium, and by passing light output from the nonlinear optical medium through an orthogonal polarizer having a polarization plane orthogonal to that of the signal light, the optical noise index calculation apparatus comprising:

an optical power measuring unit that measures a power of light output from the nonlinear optical medium as a first optical power, a power of light obtained by passing the light output from the nonlinear optical medium through an identical polarizer having a same polarization plane as that of the signal light as a second optical power, and a power of light having passed through the orthogonal polarizer as a third optical power;

a gain calculating unit that calculates a parametric gain of the nonlinear optical medium using the second optical power measured by the optical power measuring unit;

a quantum noise calculating unit that calculates a quantum noise power of the light having passed through the orthogonal polarizer using the first optical power and the third optical power measured by the optical power measuring unit, and the parametric gain calculated by the gain calculating unit; and an index calculating unit that calculates an output optical noise of the signal light extraction apparatus using the quantum noise power calculated by the quantum noise calculating unit and the parametric gain calculated by the gain calculating unit, and uses the calculated output optical noise to calculate an optical noise index.

2. The optical noise index calculation apparatus according to claim 1, wherein the parametric gain calculated by the gain calculating unit is a gain caused by a four wave mixing generated in the signal light and the sampling pulse.

3. The optical noise index calculation apparatus according to claim 1, wherein the nonlinear optical medium is a nonlinear optical fiber.

4. The optical noise index calculation apparatus according to claim 1, wherein the optical power measuring unit includes an optical spectrum analyzer that measures an optical spectrum and calculates an optical power using a waveform power integral function based on the measured spectrum.

5. A method for calculating an optical noise index of a signal light extraction apparatus that extracts signal light in a polarization plane by inputting signal light and a sampling pulse, different from the signal light in polarization plane by a given angle, to a nonlinear optical medium, and by passing light output from the nonlinear optical medium through an orthogonal polarizer having a polarization plane orthogonal to that of the signal light, the method comprising:

measuring a power of light output from the nonlinear optical medium as a first optical power, a power of light obtained by passing the light output from the nonlinear optical medium through an identical polarizer having a same polarization plane as that of the signal light as a second optical power, and a power of light having passed through the orthogonal polarizer as a third optical power;

calculating a parametric gain of the nonlinear optical medium using the second optical power;

calculating a quantum noise power of the light having passed through the orthogonal polarizer using the first optical power and the third optical power, and the parametric gain; and calculating an output optical noise of the signal light extraction apparatus using the quantum noise power and the parametric gain, and using the calculated output optical noise to calculate an optical noise index.

6. An optical sampling oscilloscope that measures signal light by inputting the signal light and a sampling pulse, different from the signal light by a given angle, to a nonlinear optical medium, and by passing light output from the nonlinear optical medium through an orthogonal polarizer having a polarization plane orthogonal to that of the signal light, the optical sampling oscilloscope comprising:

an optical power measuring unit that measures a power of light output from the nonlinear optical medium as a first optical power, a power of light obtained by passing the light output from the nonlinear optical medium through an identical polarizer having a same polarization plane as that of the signal light as a second optical power, and a power of light having passed through the orthogonal polarizer as a third optical power;

a gain calculating unit that calculates a parametric gain of the nonlinear optical medium using the second optical power measured by the optical power measuring unit;

a quantum noise calculating unit that calculates a quantum noise power of the light having passed through the orthogonal polarizer using the first optical power and the third optical power measured by the optical power measuring unit, and the parametric gain calculated by the gain calculating unit; and an index calculating unit that calculates an output optical noise using the quantum noise power calculated by the quantum noise calculating unit and the parametric gain calculated by the gain calculating unit, and uses the calculated output optical noise to calculate an optical noise index.

* * * * *